US011695885B2

(12) United States Patent
Ishida

(10) Patent No.: US 11,695,885 B2
(45) Date of Patent: Jul. 4, 2023

(54) IMAGE FORMING DEVICE

(71) Applicant: TOSHIBA TEC KABUSHIKI KAISHA, Tokyo (JP)

(72) Inventor: Takehisa Ishida, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/665,284

(22) Filed: Feb. 4, 2022

(65) Prior Publication Data

US 2022/0272215 A1 Aug. 25, 2022

(30) Foreign Application Priority Data

Feb. 19, 2021 (JP) ................................ 2021-025373

(51) Int. Cl.
*H04N 1/00* (2006.01)
*H04N 1/44* (2006.01)
*G06F 3/12* (2006.01)
*G06K 15/02* (2006.01)

(52) U.S. Cl.
CPC ..... *H04N 1/00395* (2013.01); *H04N 1/00408* (2013.01); *H04N 1/00511* (2013.01); *H04N 1/00514* (2013.01); *H04N 1/4433* (2013.01)

(58) Field of Classification Search
None
See application file for complete search history.

(56) References Cited

U.S. PATENT DOCUMENTS

| 7,788,179 | B2 | 8/2010 | Aoki | |
|---|---|---|---|---|
| 2002/0138564 | A1* | 9/2002 | Treptow | H04N 1/00416 709/203 |
| 2014/0055809 | A1* | 2/2014 | Nishida | G06F 3/1238 358/1.14 |
| 2015/0103370 | A1* | 4/2015 | Takigawa | G06F 21/31 358/1.14 |
| 2015/0264204 | A1* | 9/2015 | Inoue | H04N 1/00095 358/1.15 |
| 2017/0272601 | A1* | 9/2017 | Ando | G06F 16/903 |
| 2018/0247048 | A1* | 8/2018 | Sakemi | G06F 21/34 |

FOREIGN PATENT DOCUMENTS

| JP | 2002055576 | * | 2/2002 | ............ G06F 3/12 |
|---|---|---|---|---|
| JP | 2009272896 | * | 11/2009 | ............ G06F 13/00 |
| JP | 2010-135986 A | | 6/2010 | |
| JP | 2013228788 | * | 11/2013 | ............ G06F 3/12 |
| JP | 2018077859 | * | 5/2018 | ............ G06F 3/12 |

* cited by examiner

*Primary Examiner* — Beniyam Menberu
(74) *Attorney, Agent, or Firm* — Foley & Lardner LLP

(57) ABSTRACT

Provided is an image forming device capable of managing a printing result of a specific content as a use history of a user designated in advance. According to embodiments, an image forming device includes a printer, a memory, and a processor. The printer forms an image on a medium. The memory stores information indicating a designated user with respect to a specific content as a printing person to print the specific content. When printing of a specific content for which a designated user as a printing person is stored in the memory in correspondence is requested, the processor controls printing of the specific content by the printer with the designated user as the printing person.

14 Claims, 5 Drawing Sheets

FIG. 3

| USER | AUTHENTICATION INFORMATION | DEPARTMENT | AUTHORITY | USABLE AMOUNT | USED AMOUNT |
|---|---|---|---|---|---|
| abc | ****** | UV | GENERAL USER | 300 | 15 |
| def | ****** | YZ | ADMINISTRATOR | NO UPPER LIMIT | 90 |
| ghi | ****** | WX | GENERAL USER | 1000 | 20 |
| ... | ... | ... | ... | ... | ... |

FIG. 4

| DEPARTMENT | USABLE AMOUNT | USED AMOUNT |
|---|---|---|
| UV | 20000 | 260 |
| WX | 30000 | 350 |
| YZ | NO UPPER LIMIT | 1500 |
| ... | ... | ... |

FIG. 5

| CONTENT | | | | DESIGNATED USER |
|---|---|---|---|---|
| CONTENT NAME | DATA | PRINTING AUTHORITY | STORAGE LOCATION | |
| DOCUMENT A | FILE_A | FREE | IN MFP | abc |
| STANDBY SCREEN | IMAGE_B | FREE | IN MFP | YZ |
| DOCUMENT C | FILE_C | ADMINISTRATOR | IN MFP | def |
| ADVERTISEMENT D | IMAGE_D | FREE | www.dddd.dd | YZ |
| ... | ... | ... | ... | ... |

IMAGE FORMING DEVICE

CROSS-REFERENCE TO RELATED APPLICATION

This application is based upon and claims the benefit of priority from Japanese Patent Application No. 2021-025373, filed on Feb. 19, 2021, the entire contents of which are incorporated herein by reference.

FIELD

Embodiments described herein relate to an image forming device.

BACKGROUND

Generally, image forming devices such as a digital multi-functional peripheral include an image forming device that performs user authentication for purposes of recording a use history of each individual user and limiting a use amount of each individual user. The image forming device that performs user authentication executes printing while a user who succeeds in the user authentication has logged in. When the printing is executed, the image forming device manages a printing result in association with user information of the user who has logged in.

However, it may not be desirable to manage printing results of all contents as use history by associating the printing results with user information of operators. For example, if the use amount (number of printings) is limited for each individual user, an operator who undertakes printing of a document to be distributed to others may not want the number of printings of the document to be counted as the number of printings of the operator per se. In addition, printing of content provided for a purpose such as advertisement may be desired to be provided without a burden on a user as the operator. An image forming device of the related art has a problem to be solved that the number of printings is counted as the use history of a logged-in user regardless of what content is printed.

DESCRIPTION OF THE DRAWINGS

FIG. 3 is a diagram showing an example of user information (user management information) about a user;

FIG. 4 is a diagram showing an example of department management information for managing an amount of printing for each individual department;

FIG. 5 is a diagram showing an example of content management information for managing contents that can be printed;

DETAILED DESCRIPTION

In general, according to at least one embodiment, there is provided an image forming device capable of managing a printing result of a specific content as a use history of a user designated in advance so as to solve the above problem.

According to at least one embodiment, an image forming device includes a printer, a memory, and a processor. The printer forms an image on a medium. The memory stores information indicating a designated user with respect to a specific content as a printing person to print the specific content. When printing of a specific content for which a designated user as a printing person is stored in the memory in correspondence is requested, the processor controls printing of the specific content by the printer with the designated user as the printing person.

Hereinafter, exemplary embodiments will be described with reference to the drawings.

First, a configuration of a digital multi-functional peripheral (MFP) 1 as an image forming device according to an embodiment is explained.

Figure 1:
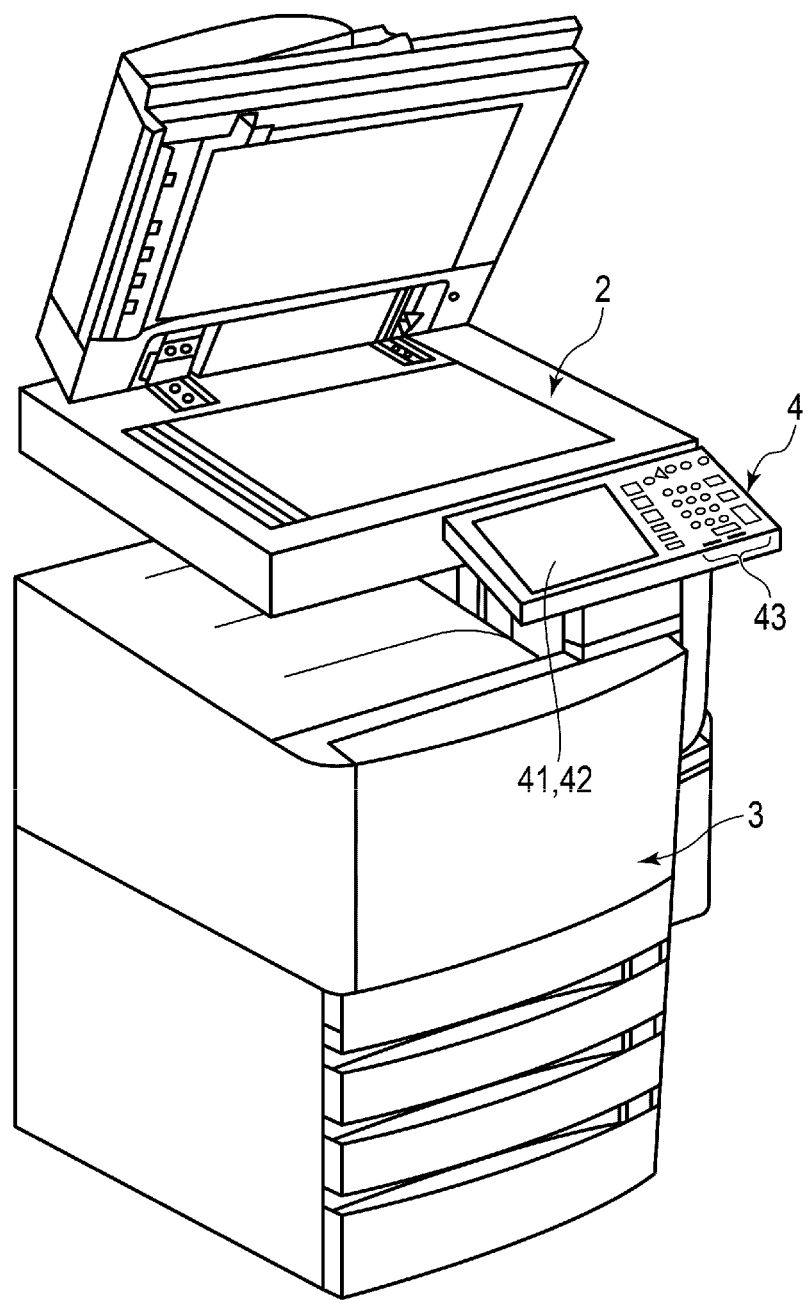
FIG. 1 is an external view of a configuration example of a digital multi-functional peripheral as an image forming device according to at least one embodiment.

FIG. 1 is a perspective view showing an external configuration example of the digital multi-functional peripheral 1 as an image forming device according to the embodiment.

As shown in FIG. 1, the digital multi-functional peripheral 1 includes a scanner 2, a printer 3, and an operation panel 4.

The scanner 2 is provided at an upper portion of a main body of the digital multi-functional peripheral. The scanner 2 is a device that optically reads an image of a document. The scanner 2 includes a document positioning glass plate on which the document to be scanned is positioned. The scanner 2 scans the document on the document positioning glass plate through a glass of the document positioning glass plate. The scanner 2 includes a carriage, a photoelectric conversion unit and the like. The carriage, the photoelectric conversion unit and the like are provided below the document positioning glass plate. The scanner 2 reads an image of the entire document by acquiring image data in a main scanning direction with the photoelectric conversion unit while moving the carriage in a sub-scanning direction.

An auto document feeder (ADF) is provided above the scanner 2. The ADF is provided in an openable and closable manner. The ADF also functions as a document positioning plate cover for the scanner 2. The ADF covers an entire document reading area of the document positioning glass plate in a closed state. Further, the ADF includes a sheet supply tray, a conveying system and the like. An ADF 5 takes out documents set in the sheet supply tray one by one in the closed state, and conveys the document such that a reading surface of the document taken out passes through a predetermined reading position. When the ADF conveys the document, the scanner 2 reads an image of the entire document by reading the surface of the document when the document conveyed by the ADF passes through the predetermined reading position.

The printer 3 includes a sheet supply cassette, a conveying system, and an image forming mechanism. The sheet supply cassette accommodates sheets as an image formation target medium on which an image is to be printed. For example, the sheet supply cassette can be attached to and detached from a lower portion of the main body of the digital multi-functional peripheral. The sheets accommodated in the sheet supply cassette are taken out one by one by a sheet supply roller. The conveying system conveys the sheet taken out by the sheet supply roller from the sheet supply cassette to an image forming position or an image transfer position.

The image forming mechanism of the printer 3 is a mechanism that forms an image. As the image forming mechanism, ones of various image forming types can be applied. For example, the image forming mechanism may be an electrophotographic type, an inkjet type, or a thermal transfer type. Further, the image forming mechanism may form a color image and may form a monochrome image. The image forming mechanism forms the image on the sheet supplied by the conveying system. In addition, the image forming mechanism may transfer an image formed on an intermediate transfer member to the sheet supplied by the conveying system at the image transfer position.

The operation panel 4 is a user interface. The operation panel 4 includes a display unit (display) 41, a touch panel 42, and operation buttons 43. The display unit 41 of the operation panel 4 displays operation guidance, preset contents and the like. In addition, the display unit 41 displays icons as operation buttons that can be input at the touch panel 42 or the like. The touch panel 42 is provided on a display screen of the display unit 41. The touch panel 42 detects a portion touched by a user on the display screen of the display unit 41. The operation buttons 43 include, for example, a numeric keypad and operation buttons instructing a specific operation. The user inputs an operation instruction on the operation panel 4 by using the operation buttons 43 or the touch panel 42.

Next, a configuration of the control system of the digital multi-functional peripheral 1 configured as described above will be described.

Figure 2:
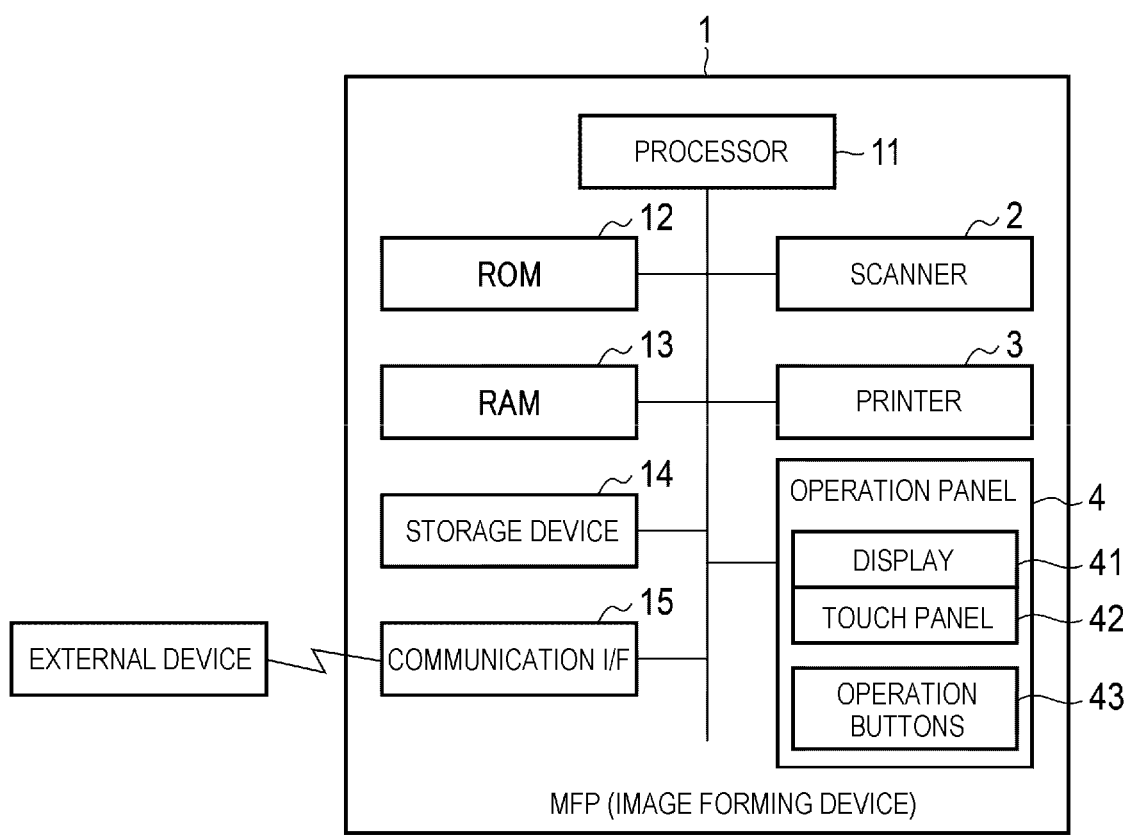
FIG. 2 is a block diagram showing a configuration example of a control system.

FIG. 2 is a block diagram explaining a configuration example of the control system of the digital multi-functional peripheral 1.

The digital multi-functional peripheral 1 includes a system control unit to which the scanner 2, the printer 3, and the operation panel 4 are connected. As shown in FIG. 2, the system control unit includes a processor 11, a random access memory (RAM) 12, a read-only memory (ROM) 13, a storage device (memory) 14, a communication interface (I/F) 15 and the like.

The processor 11 connects to the scanner 2, the printer 3, the operation panel 4, and the ADF 5 via an interface. The processor 11 realizes various processing functions by executing a program stored in the ROM 13 or the storage device 14. For example, the processor 11 outputs operation instructions to the respective units and processes various information from the respective units by executing a program stored in the ROM 13.

The RAM 12 temporarily stores data. The RAM 12 operates as, for example, a working memory or a buffer memory. The ROM 13 is a non-volatile memory that cannot be rewritten. The ROM 13 stores a program, control data or the like.

The storage device 14 is a non-volatile memory that can be rewritten. For example, the storage device 14 is constituted by a storage device such as a hard disk drive (HDD) or a solid state drive (SSD). The storage device 14 stores control data, a control program, setting information, user information, and contents (printing data, display data or the like). The user information is information about a user (registrant) who uses the digital multi-functional peripheral 1.

In at least one embodiment, the content is data that can be printed by the digital multi-functional peripheral. For example, the content may be printing data uploaded by the user, and may be display data for being displayed on the display 41 of the operation panel 4. Further, the content may be data stored in a location other than the storage device 14, and the storage device 14 may store information indicating a location where the content is stored. In addition, the storage device 14 also stores management information (content management information) for each content.

The communication I/F 15 is an interface that performs data communication with an external device. For example, the communication I/F 15 acquires an image to be printed on sheets or an operation instruction or the like from a user terminal such as a PC. Further, the communication I/F 15 may be an interface that communicates with a server holding data.

The operation panel 4 includes the display unit (the display) 41, the touch panel (the operating device) 42, the operation buttons (the operating device) 43 and the like. A display content of the display unit 41 is controlled according to an operation instruction from the processor 11. The touch panel 42 is provided on the display screen of the display unit 41 and detects a touched position on the display screen. For example, the processor 11 displays icons that can be selected on the touch panel 42 together with the operation guidance on the display screen of the display unit 41. The processor 11 determines information input by the user according to the touched position detected by the touch panel 42. The operation buttons 43 are configured with, for example, hard keys such as a start key and a reset key. The processor 11 detects an input button.

Next, the management of user information and the management of contents by the digital multi-functional peripheral 1 as an image forming device according to an embodiment will be described.

FIG. 3 is a diagram showing an example of user information about a user who uses the digital multi-functional peripheral 1 according to the embodiment.

The digital multi-functional peripheral 1 manages information about a user to be used and a use record of the user according to the user information. The user information is set for each individual user. In the example shown in FIG. 3, the user information includes information such as user name, authentication information, authorities, department, usable amount, and used amount. The user information is stored in the storage device 14. The user information may be stored in an external device such as a server as a higher-level device. Further, some of the user information may be stored in the storage device 14, and other information may be stored in an external device.

The user name is information for identifying the user. The user name may be stored by associating a name with identification information (user ID). The department is information indicating a group (department) to which the user belongs. The authority is information indicating an authority given to the user.

The authentication information is information for authenticating the user. The authentication information is a password, information on a storage medium owned by the user, biometric information or the like. The authentication information may be information in accordance with the user authentication. The authentication information may be stored in an external device in association with information indicating the user such as the identification information.

The usable amount is information indicating the number of printings (usable amount) allowed to the user or the like. The usable amount may be set by an administrator or the like. The used amount is information indicating a used amount of the digital multi-functional peripheral 1 by the user (amount of printing). The used amount may be the number of times the image is printed on the medium (the number of printings), and may be a value converted to the number of sheets of a predetermined size on which the image is printed.

Further, the digital multi-functional peripheral 1 as an image forming device may manage the used amount such as the number of printings for each individual department.

FIG. 4 is a diagram showing an example of department management information for the digital multi-functional peripheral 1 to manage a use status such as the number of printings for each individual department.

The digital multi-functional peripheral 1 may store not only the user information for each individual user but also department management information for managing the use status for each individual department (group). The department management information is set for each individual department. In the example shown in FIG. 4, the department management information includes information such as department name, usable amount, and used amount. The department management information is stored in, for example, the storage device 14. Further, the department management information may be stored in an external device.

The department name is information for identifying a department. The department name may be stored by associating a name of a department with an identification number of the department (department code). The usable amount is information indicating the number of printings allowed to the department. The usable amount may be set by an operation of the administrator. The used amount is information indicating the amount actually used by the department (the number of printings). The used amount may be the number of times the image is printed on the medium, and may be a value converted to the number of sheets with a predetermined size on which the image is printed.

Next, the management of contents that can be printed by the digital multi-functional peripheral 1 according to an embodiment will be described.

FIG. 5 is a diagram showing an example of content management information for managing contents that can be printed by the digital multi-functional peripheral 1.

The digital multi-functional peripheral 1 prints a pre-registered content according to an operation of the user on the operation panel 4. The digital multi-functional peripheral 1 manages the contents that can be printed according to the content management information. The digital multi-functional peripheral 1 prints the content and stores a printing history according to the content management information, for example.

In the example shown in FIG. 5, the content management information includes information such as content name, data, storage location, and designated user. The content name, the data and the storage location are information indicating contents. The designated user can be set for each individual content. For example, the content is uploaded by the user and the designated user is registered (set) by the operation of the administrator.

The content name is information for identifying a content. The content name may be stored by associating a name and an identification number. For example, when the user is required to select a content, the display 41 displays a name list of printable contents. The user selects a content to be printed from the names of the contents displayed on the display 41. The data is information indicating, for example, a file name of data to be a content.

The storage location is information indicating a location where data of contents is stored. The storage location may be information indicating data of contents stored not only in the storage device 14 of the digital multi-functional peripheral 1 but also in an external device. For example, the storage location may be a uniform resource identifier (URL) or the like.

The designated user indicates a specific user associated with the content. The printing of contents is managed as being set as the content management information and being printed by the designated user regardless of the operator. When the content is printed, the printing history of the content is stored in association with the designated user. For example, the amount of printing (number of printings) of the content is counted as the used amount of the designated user.

In addition, the designated user may be a department as shown in FIG. 5. Regarding a content that the designated user is a department, the printing history such as the number of printings is stored for each individual department which is set as a designated user. Further, the designated user may not be set. If a user authentication setting is valid, a content for which the designated user is not set is managed as being printed by a logged-in operator (user).

Next, an operation of a content registration process for registering contents in the digital multi-functional peripheral 1 according to an embodiment will be described.

The digital multi-functional peripheral 1 prints a content designated by the user from pre-registered contents. For example, in the digital multi-functional peripheral 1, a content to be registered is uploaded from an external device. The digital multi-functional peripheral 1 registers the content management information for the uploaded content to make the content printable.

Figure 6:
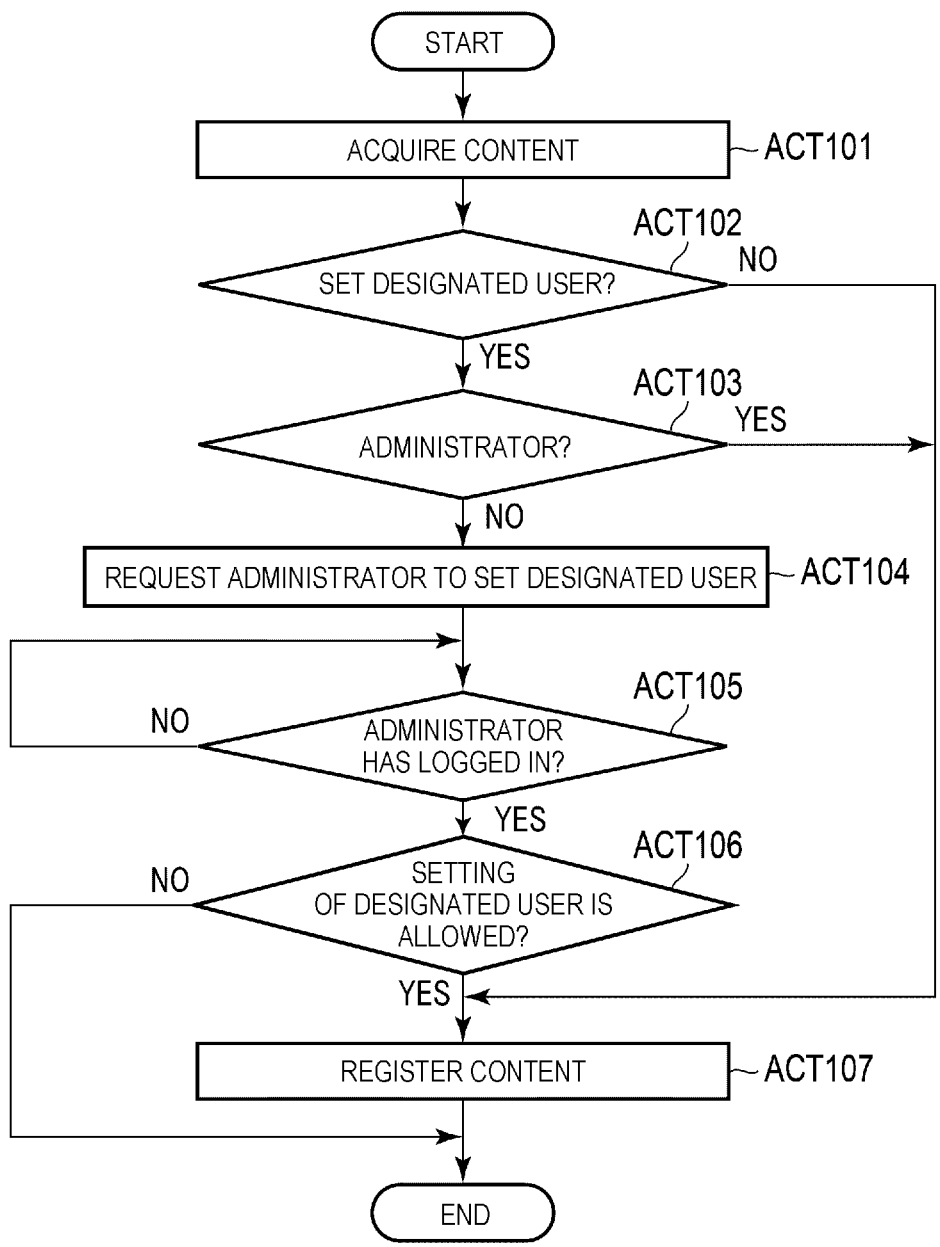
FIG. 6 is a flowchart for explaining a content registration process.

FIG. 6 is a flowchart for explaining an operation example of the content registration process for registering contents in the digital multi-functional peripheral 1 according to an embodiment.

The processor 11 of the digital multi-functional peripheral 1 acquires a content to be registered (ACT 101). For example, the processor 11 receives a content uploaded by a user from an external device via the communication interface 15. The user who uploads the content may be an administrator and may be a user other than the administrator. If a designated user is set for the content, the user also uploads information indicating the designated user to the digital multi-functional peripheral 1. The content may be acquired from an external storage device connected to the digital multi-functional peripheral 1 or the like via a serial interface or the like.

The processor 11 stores data of the acquired content in an accessible state. For example, the processor 11 stores the data of the uploaded content in the storage device 14. Further, the content uploaded to the digital multi-functional peripheral 1 may be a content obtained by storing data in an external device accessible via the communication interface 15. If the data of contents is stored in the external device, the processor 11 stores information (for example, URL) indicating the storage location of the data of contents in the storage device 14 or the like.

When a content is acquired, the processor 11 determines whether a designated user is to be set for the content (ACT 102). For example, when information indicating a designated user who is to correspond to the content is received together with the content, the processor 11 determines that the designated user is to be set. Further, after the content is acquired, the processor 11 may query the user uploading the content about the designated user to be set.

If no designated user is to be set for the content (ACT 102, NO), the processor 11 registers the content management information of the content as no setting of designated user (ACT 107).

If the designated user is set for the content (ACT 102, YES), the processor 11 determines whether the user uploading the content is an administrator (ACT 103).

If the user uploading the content is not an administrator (ACT 103, NO), the processor 11 requests the administrator to set the designated user for the content (ACT 104). For example, the processor 11 requests the administrator to set the designated user to a preset contact of the administrator (for example, a memory address). After the processor 11 requests the administrator to set the designated user, the processor 11 is in a state of waiting for the setting of the designated user for the content.

When the administrator logs in after the setting of the designated user is requested (ACT 105, YES), the processor 11 receives an instruction for setting or not setting the designated user for the content from the administrator (ACT 106). For example, when the administrator logs in by operating the operation panel 4, the processor 11 displays a selection screen asking whether to set the designated user for the content on the display 41. The administrator may give an instruction for allowing or not allowing the setting of the designated user for the content in the selection screen displayed on the display 41.

Further, the processor 11 may receive the login of the administrator from an external device that communicates via the communication interface 15. The processor 11 receives an instruction for allowing or not allowing the setting of the designated user for the content according to the instruction from the administrator logged in from the external device.

If the administrator does not allow the setting of the designated user for the content (ACT 106, NO), the processor 11 ends the content registration process without registering the content. If the administrator does not allow the setting of the designated user for the content, the processor 11 may notify an upload source of the content that the setting of the designated user is not allowed.

If the administrator allows the setting of the designated user for the content (ACT 106, YES), the processor 11 stores (registers) content management information including the designated user associated with the content (ACT 107). Further, if the user uploading the content is an administrator (ACT 103, YES), the processor 11 registers the content management information including the designated user associated with the content (ACT 107).

When the content management information is registered, the processor 11 stores the designated user in association with the information related to the content. For example, the processor 11 registers the content management information in which the content is associated with the designated user as shown in FIG. 5 in the storage device 14. The processor 11 completes the registration of the content by registering the content management information.

According to the above content registration process, the digital multi-functional peripheral as an image forming device can register the acquired designated user for the content. As a result, the digital multi-functional peripheral can be set (managed) such that a specified content is printed by a designated user regardless of an actual operator.

Next, an operation when a printing process of contents by the digital multifunction peripheral 1 according to the embodiment is executed will be described.

Figure 7:
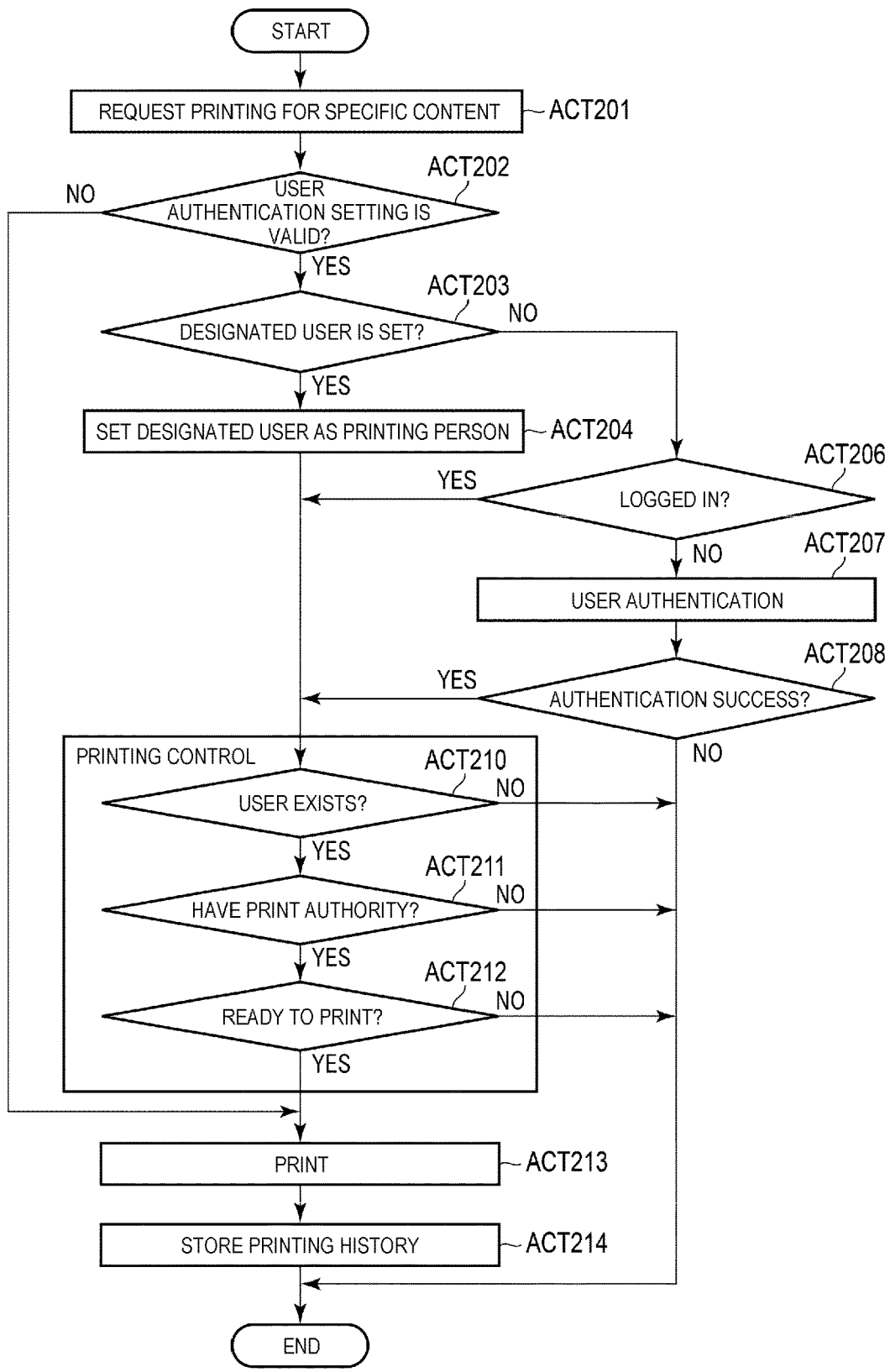
FIG. 7 is a flowchart for explaining a printing process of a specific content.

FIG. 7 is a flowchart for explaining the operation when a printing process of contents by the digital multifunction peripheral 1 according to the embodiment is executed.

The processor 11 of the digital multifunction peripheral 1 according to the embodiment receives a printing request for a content (specific content) in which the content management information is registered regardless of the login state of the user (ACT 201). The user inputs the printing request for the specific content by using an operating device such as the touch panel 42 or the operation buttons 43.

For example, the processor 11 displays a list of printable specific contents registered in the digital multi-functional peripheral 1 on the display 41 according to an operation by the user. The processor 11 receives the printing request for the specific content selected by the user using the touch panel 42 or the operation buttons 43 in a state where the list of the specific contents is displayed.

Further, the processor 11 may receive a printing request for a standby screen (specific content) displayed by the display 41 in a standby state. The processor 11 displays an image of a preset content on the display 41 as a standby screen (idle screen) in the standby state. The processor 11 receives the printing request for the standby screen as the specific content displayed on the display 41 even in a state where the specific user has not logged in.

The processor 11 determines whether the user authentication setting is valid upon receiving the printing request for the specific content (ACT 202). If the user authentication setting is valid, the processor 11 executes the printing process after specifying a user who executes printing (printing person). If the user authentication setting is valid, the processor 11 performs a process of storing a result of the printing process in association with the printing person. If the user authentication setting is invalid, the processor 11 performs the printing process without specifying the printing person.

That is, if the user authentication setting is invalid (ACT 202, NO), the processor 11 proceeds to ACT 213 without specifying the user (without performing the user authentication). Therefore, if the user authentication setting is not valid (if the user authentication setting is invalid), the processor 11 executes the printing process of the specific content for which the printing is requested.

If the user authentication setting is valid (ACT 202, YES), the processor 11 specifies the user (printing person) to print the specific content for which the printing is requested. If the user authentication setting is valid, the processor 11 determines whether a designated user is set for the specific content for which the printing is requested (ACT 203). The processor 11 determines whether a designated user is set for the specific content for which the printing is requested based on the content management information stored in the storage device 14.

If the designated user is set (ACT 203, YES), the processor 11 sets the designated user for the specific content for which the printing is requested as the printing person (ACT 204). For example, the processor 11 sets the designated user for the specific content as the printing person even in a state where the specific user has logged in. Further, the processor 11 sets the designated user for the specific content as the printing person even in a state where the specific user has not logged in. In other words, if the designated user for the specific content is set, the processor 11 proceeds to a printing control described later with the designated user as the printing person regardless of the login state of the user.

If the designated user is not set (ACT 203, NO), the processor 11 sets the operator as the printing person. If the designated user is not set, the processor 11 checks whether the specific user has logged in (ACT 206). If the specific user has logged in (ACT 206, YES), the processor 11 sets the logged-in user (operator) as the printing person and proceeds to ACT 210.

If the specific user has not logged in (ACT 206, NO), the processor 11 performs the user authentication for authenticating the user as an operator (ACT 207). The user authentication may be a process that specifies an operator. For example, the processor performs the user authentication by collating authentication information acquired from the operator with authentication information stored in association with the user information of the user as a registrant. If the user authentication is successful (ACT 208, YES), the processor 11 sets the user as the printing person and proceeds to ACT 210. If the user authentication is not successful (ACT 208, NO), the processor 11 ends the process as a printing error.

After the printing person for the specific content is set, the processor 11 sets the printing person as an executor and performs a printing control for printing a specific content (ACT 210 to 212). The processor 11 determines whether the printing person actually exists as a user who can use the digital multi-functional peripheral 1 (ACT 210). The processor 11 checks whether the printing person exists depending on whether the user information of the set printing person is registered in the storage device 14.

For example, the processor 11 can check whether the user information of the designated user is deleted after the specific content is registered by confirming that the printing person exists. If the user information of the designated user set as the printing person is deleted, the processor determines that the printing person does not exist. If it is determined that the printing person does not exist (ACT 210, NO), the processor 11 stops printing the specific content. If an operator succeeded in the user authentication is set as the printing person, it is confirmed that the printing person exists and thus the processor 11 may omit the process of ACT 210.

In addition, the processor 11 determines whether the set printing person has an authority to print the specific content (ACT 211). The processor 11 determines whether the printing person has a printing authority for the specific content by comparing a printing authority included in the content management information of the specific content with an authority of the printing person. If it is determined that the printing person does not have the printing authority for the specific content (ACT 211, NO), the processor 11 stops printing the specific content.

Further, the processor 11 determines whether the device is in a state that the printing person can print the specific content (ACT 212). For example, the processor 11 specifies the used amount (used amount of the printing person) and the usable amount stored corresponding to the printing person based on the user information. If an amount obtained by adding the amount of printing (planned number of printings) of the specific content to the used amount of the printing person is equal to or greater than the usable amount, the processor 11 determines that the specific content cannot be printed. In addition, if the used amount of the printing person is equal to or greater than the usable amount, the processor 11 may determine that the specific content cannot be printed. If it is determined that the specific content cannot be printed (ACT 212, NO), the processor 11 stops printing the specific content.

If it is determined that the specific content can be printed (ACT 212, YES), the processor 11 executes the printing process of the specific content (ACT 213). The processor 11 acquires printing data of the specific content by acquiring data of the specific content based on the content management information of the specific content. The processor 11 prints an image of the specific content on a medium by the printer 3 based on the printing data of the specific content.

When the specific content is printed, the processor 11 stores the printing result of the specific content as a printing history in association with the printing person (ACT 214). The processor 11 counts the used amount such as the number of printings, and adds the counted used amount to the used amount of the printing person. Therefore, with respect to the printing result of the specific content, the printing history such as the used amount is stored as being executed by the designated user corresponding to the specific content. As a result, if the operator is not the designated user, the operator can print the specific content without counting this printing as the used amount of the operator per se.

According to the above processes, the digital multi-functional peripheral as an image forming device can record the printing result of the specific content as the result of the execution by the designated user corresponding to the specific content. Further, the digital multi-functional peripheral as an image forming device can provide the printing of pre-registered contents regardless of the login state of the specific user. Thus, the user can perform the printing without logging in as the printing executed by the designated user without counting the printing as the used amount of the user.

Further, the image forming device according to the embodiment can register an image to be displayed as the standby screen (idle screen) on the display as the specific content in association with the designated user. If the standby screen is registered as the specific content, the image forming device prints the standby screen to be displayed on the display with the designated user as the printing person.

Therefore, the image forming device according to the embodiment can print the standby screen (idle screen) to be displayed on the display regardless of the login state of the specific user (even without logging in).

Further, the image forming device according to the embodiment prints the standby screen with the designated user as the printing person, and thus the image forming device can provide the printing result of the standby screen to the user without burdening the user (operator) who requests the printing. Since the standby screen is an image or video assumed to be viewed by a non-designated user, the standby screen may be a content for a purpose such as advertisement. Since the content for a purpose such as advertisement can be printed without logging in by the image forming device according to the embodiment, the user (operator) can easily print the content.

While certain embodiments have been described, the embodiments have been presented by way of examples only, and are not intended to limit the scope of the disclosure. These novel embodiments described herein may be embodied in a variety of other forms, various omissions, substitutions and changes can be made without departing from the spirit of the disclosure. These embodiments and modifications thereof are included in the scope and spirit of the disclosure and are also included in the disclosure described in the scope of claims and an equivalent scope thereof.

What is claimed is:

1. An image forming device, comprising:
   a printer;
   a memory configured to store information indicating a designated user corresponding to a specific content as a printing person to print the specific content;
   a processor configured to, when printing is requested of a specific content for which a designated user as a printing person is stored in the memory in correspondence, control printing of the specific content by the printer with the designated user as the printing person; and a display, wherein the specific content is a display content to be displayed as a standby screen on the display, and the processor is configured to cause the printer to print the display content with the designated user stored with respect to the display content as a printing person regardless of a login state of a user, when a printing request for the display content to be displayed as a standby screen is input to the display.

2. The device according to claim 1, wherein the processor is configured to store information indicating a printing result of the specific content by the printer in association with the designated user corresponding to the specific content.

3. The device according to claim 2, wherein the designated user is a department corresponding to the specific content, and the processor is configured to store the information indicating a printing result of the specific content by the printer in association with the department corresponding to the specific content.

4. The device according to claim 1, wherein the processor is configured to determine a printing or display of the specific content based on user information stored in the memory.

5. The device according to claim 4, wherein the user information includes at least one of a user name, user authentication information, department names corresponding to a user, a used amount of the device by the user, or a usable amount of the device by the user.

6. The device according to claim 1, wherein the processor is configured to determine a printing or display of the specific content based on content management information stored in the memory.

7. The device according to claim 6, wherein the content management information includes at least one of specific content name, printing authority, data storage location, or designated user corresponding to each of the specific content.

8. The device according to claim 1, wherein the processor is configured to determine a printing or display of the specific content based on department management information stored in the memory.

9. The device according to claim 8, wherein the department management information includes at least one of department identification, a used amount of the device by a department, or a usable amount of the device by the department.

10. The device according to claim 1, wherein the specific content includes at least one of printing data or display data.

11. The device according to claim 1, wherein the processor is configured to prompt an administrator to set a designated user.

12. The device according to claim 1, wherein the processor is configured to determine whether a designated user is authenticated.

13. The device according to claim 1, wherein the processor is configured to, when a usable amount of the device by the designated user is below a predetermined value, prevent use of the device by the designated user.

14. An image forming device, comprising:

a printer;

a memory configured to store information indicating a designated user corresponding to a specific content as a printing person to print the specific content;

a processor configured to, when printing is requested of a specific content for which a designated user as a printing person is stored in the memory in correspondence, control printing of the specific content by the printer with the designated user as the printing person;

a display configured to display an image of a specific content and an operation receiver configured to receive a printing request for the specific content displayed on the display, wherein the processor is configured to control the printing of the specific content by the printer with the designated user as a printing person when the printing request for the specific content is input to the operation receiver and when a designated user is stored in the memory with respect to the specific content, the specific content is a display content to be displayed as a standby screen on the display, and the processor is configured to cause the printer to print the display content with the designated user stored with respect to the display content as a printing person regardless of a login state of a user, when a printing request for the display content to be displayed as a standby screen is input to the display.

* * * * *